US009800175B2

(12) United States Patent
Pu et al.

(10) Patent No.: US 9,800,175 B2
(45) Date of Patent: Oct. 24, 2017

(54) FIVE-LEVEL CONVERTING DEVICE

(71) Applicant: Delta Electronics (Shanghai) Co., Ltd., Shanghai (CN)

(72) Inventors: Bo-Yu Pu, Shanghai (CN); Ming Wang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/135,547

(22) Filed: Apr. 21, 2016

(65) Prior Publication Data

US 2017/0012554 A1    Jan. 12, 2017

(30) Foreign Application Priority Data

Jul. 10, 2015    (CN) .......................... 2015 1 0405527

(51) Int. Cl.
| | |
|---|---|
| *H02M 7/483* | (2007.01) |
| *H02M 7/06* | (2006.01) |
| *H02M 7/155* | (2006.01) |
| *H02M 7/217* | (2006.01) |
| *H02M 7/46* | (2006.01) |

(Continued)

(52) U.S. Cl.
CPC .............. *H02M 7/483* (2013.01); *H02M 7/06* (2013.01); *H02M 7/155* (2013.01); *H02M 7/217* (2013.01); *H02M 7/46* (2013.01); *H02M 7/515* (2013.01); *H02M 7/537* (2013.01); *H02M 7/487* (2013.01)

(58) Field of Classification Search
CPC ........ H02M 7/06; H02M 7/155; H02M 7/217; H02M 7/46; H02M 7/483; H02M 7/487; H02M 7/515; H02M 7/537
See application file for complete search history.

(56) References Cited

U.S. PATENT DOCUMENTS

| | | | |
|---|---|---|---|
| 6,697,274 B2 * | 2/2004 | Bernet ................. | H02M 7/487 |
| | | | 363/132 |
| 9,083,230 B2 * | 7/2015 | Narimani ................ | H02M 3/07 |

(Continued)

FOREIGN PATENT DOCUMENTS

| | | |
|---|---|---|
| CN | 100466448 C | 3/2009 |
| CN | 102624269 B | 9/2014 |

(Continued)

*Primary Examiner* — Gustavo Rosario Benitez
*Assistant Examiner* — Demetries A Gibson
(74) *Attorney, Agent, or Firm* — CKC & Partners Co., Ltd.

(57) ABSTRACT

A five-level converting device includes an AC terminal, a bus capacitor module having a positive terminal, a negative terminal and a neutral terminal, a first switch module and a second switch module. The first switch module includes a bidirectional switching circuit, and the bidirectional switching circuit includes two first switching units reversely connected in series. The second switch module includes two second switching units, two third switching units, two fourth switching units, and two fifth switching units. The two second switching units are cascaded and connected to the two fourth switching units in parallel. The third, the fourth and the fifth switching units are cascaded and are connected to the bus capacitor module in parallel. Two different connection points of the first switch module are connected to the third switching units and fifth switching units through two flying capacitor modules respectively.

16 Claims, 7 Drawing Sheets

(51) Int. Cl.
  *H02M 7/515*   (2007.01)
  *H02M 7/537*   (2006.01)
  *H02M 7/487*   (2007.01)

(56) References Cited

U.S. PATENT DOCUMENTS

| | | | | |
|---|---|---|---|---|
| 9,214,878 | B2* | 12/2015 | Takizawa | H02M 7/487 |
| 9,667,166 | B2* | 5/2017 | Gan | H02M 7/487 |
| 2012/0218795 | A1* | 8/2012 | Mihalache | H02M 7/487 |
| | | | | 363/97 |
| 2013/0044526 | A1* | 2/2013 | Soua | H02M 7/487 |
| | | | | 363/131 |
| 2013/0270917 | A1* | 10/2013 | Yatsu | H02J 1/00 |
| | | | | 307/77 |
| 2014/0003103 | A1* | 1/2014 | Aaltio | H02M 1/32 |
| | | | | 363/56.03 |
| 2014/0009984 | A1* | 1/2014 | Takizawa | H02M 7/00 |
| | | | | 363/65 |
| 2014/0211520 | A1 | 7/2014 | Zhang et al. | |
| 2014/0254228 | A1* | 9/2014 | Ying | H02M 7/5387 |
| | | | | 363/132 |
| 2014/0293667 | A1* | 10/2014 | Schroeder | H02M 7/483 |
| | | | | 363/60 |
| 2014/0339899 | A1* | 11/2014 | Takizawa | H02M 7/487 |
| | | | | 307/63 |
| 2015/0003127 | A1* | 1/2015 | Takizawa | H02M 1/32 |
| | | | | 363/50 |
| 2015/0200602 | A1* | 7/2015 | Narimani | H02M 5/4585 |
| | | | | 363/37 |
| 2015/0249403 | A1* | 9/2015 | Sato | H02M 7/537 |
| | | | | 363/127 |
| 2015/0303819 | A1* | 10/2015 | Qu | H02M 7/487 |
| | | | | 363/35 |
| 2015/0311776 | A1* | 10/2015 | Lavieville | H02M 7/487 |
| | | | | 363/65 |
| 2016/0006368 | A1* | 1/2016 | Kusuno | H02M 7/487 |
| | | | | 363/131 |
| 2016/0149507 | A1* | 5/2016 | Lei | H02M 1/12 |
| | | | | 363/35 |
| 2016/0268924 | A1* | 9/2016 | Fu | H02M 7/483 |
| 2016/0329811 | A1* | 11/2016 | Du | H02M 7/487 |

FOREIGN PATENT DOCUMENTS

| | | |
|---|---|---|
| CN | 103023363 B | 4/2015 |
| CN | 103236797 B | 7/2015 |
| CN | 103178721 B | 9/2015 |
| CN | 204633631 U | 9/2015 |
| TW | I427905 B | 2/2014 |

* cited by examiner

FIVE-LEVEL CONVERTING DEVICE

RELATED APPLICATIONS

This application claims priority to China Application Serial Number 201510405527.7, filed Jul. 10, 2015, which is herein incorporated by reference.

BACKGROUND

Field of Invention

The present invention relates to a multi-level converting device. More particularly, the present invention relates to a five-level converting device.

Description of Related Art

In high power applications, compared to the low-voltage system, the current level of the medium-voltage system or of the high-voltage system is lower, and with higher efficiency and better economy. Therefore, the medium-voltage system and the high-voltage system are the best choices in the field of high power conversion.

For the medium-voltage system and the high-voltage system, the voltage rating and the larger dv/dt of the existing power devices are the two main problems, which makes the multi-level technology get more attention and application.

SUMMARY

The disclosure provides a simple topological structure of a five-level converting device with a high application value.

The five-level converting device of the present disclosure includes an AC terminal, a bus capacitor module, a first switch module, a second switch module, and two flying capacitor modules. The bus capacitor module has a positive terminal, a negative terminal and a neutral terminal. The first switch module includes a bidirectional switching circuit, wherein the bidirectional switching circuit includes two first switching units reversely connected in series, a terminal of one of the first switching units connects to the neutral terminal of the bus capacitor module. The second switch module includes two second switching units, two third switching units, two fourth switching units, and two fifth switching units, wherein the two second switching units are cascaded, the two third switching units, the two fourth switching units and the two fifth switching units are cascaded and are connected to the bus capacitor module in parallel, wherein the two third switching units connect to the positive terminal of the bus capacitor module, the two fifth switching units connect to the negative terminal of the bus capacitor module, the two fourth switching units and the two second switching units are connected in parallel, wherein a connection point between the two fourth switching units connects to the AC terminal, a connection point between the two second switching units connects to a terminal of the other of the two first switching units. The two flying capacitor modules connect across the first switch module and the second switch module, wherein a connection point between the two first switching units and the terminal of the other of the two first switching units connect to a connection point between the two third switching units and to a connection point between the two fifth switching units through the two flying capacitor modules respectively.

In summary, comparing to the conventional art, the technical device of the present disclosure has obvious advantages and benefits. The present disclosure uses asymmetrical circuit structure (two flying capacitor units has different connections), thereby the circuit design is more flexible and resilient. Besides, since the number of the switching units in the present disclosure is smaller than the traditional art, driving the device thereby is easier. Compared to the conversion three-level technology, the five-level conversion technology here has better electrical performance.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
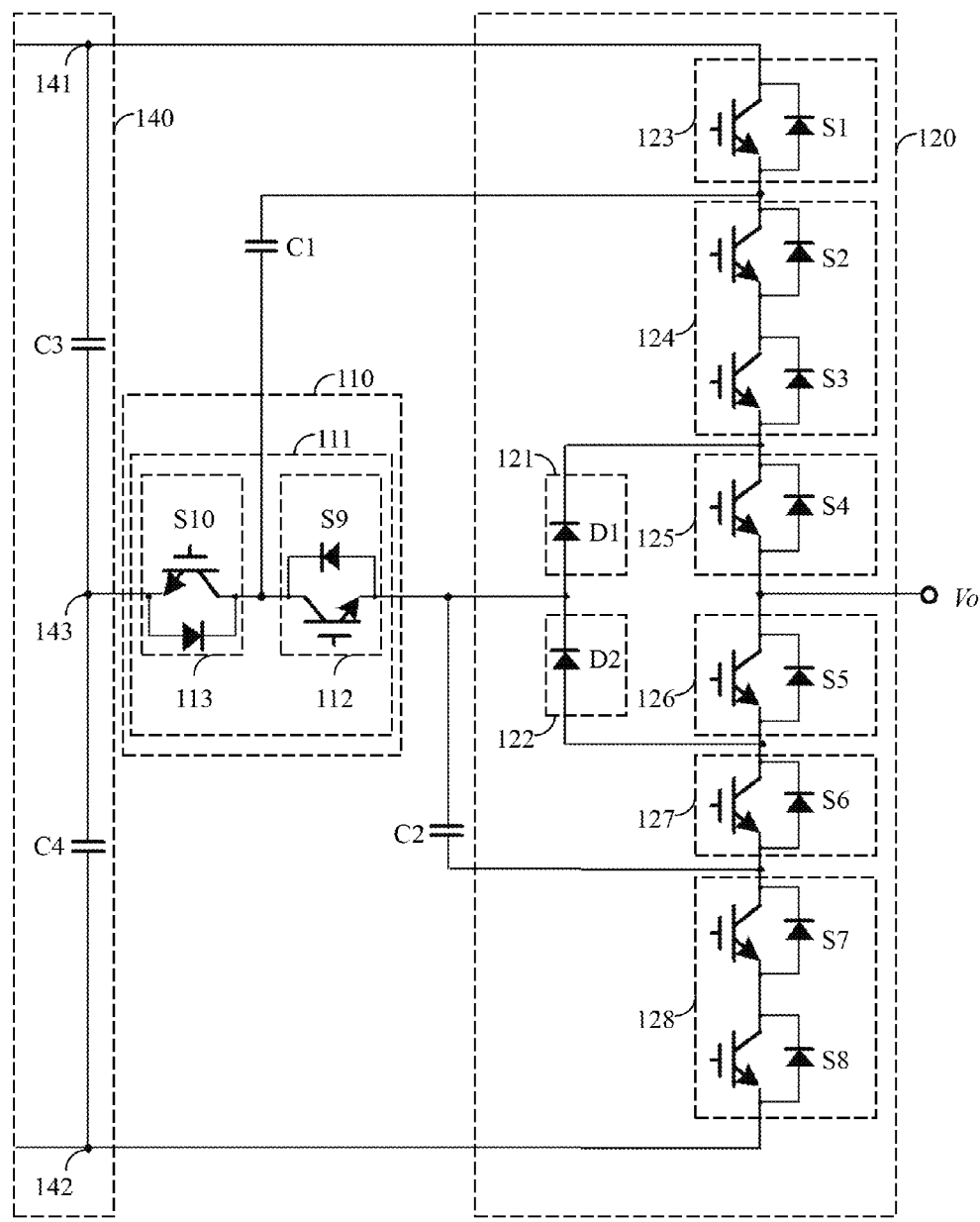
FIG. 1 is a diagram illustrating a circuit diagram of a five-level converting device according to a first exemplary embodiment of the present disclosure.

Reference will now be made in detail to the present embodiments of the disclosure, examples of which are illustrated in the accompanying drawings. Wherever possible; the same reference numbers are used in the drawings and the description to refer to the same or like parts. On the other hand, the well-known elements are not described in the exemplary embodiments, to avoid unnecessary restrictions of the present disclosure.

As used herein, "about", "approximately" or "around" describe amounts which are subject to slight variations in the actual value but such variations do not have material impact. Unless otherwise noted in the embodiment, the amounts described by "about", "around" or "approximately" typically have a level of tolerance of under twenty percent, or, better, under ten percent, or, better still, under five percent.

An aspect of the present disclosure is to provide a five-level converting device, as shown in FIG. 2, FIG. 3, FIG. 5, and FIG. 6, the five-level converting device can be embodied as an AC-DC converter (or also known as rectifier or rectifying device), to convert the single-phase, three-phase, or multi-phase AC voltage into a DC voltage. In addition, as shown in FIG. 1, and FIG. 4, the five-level converting device can be embodied as a DC-AC converter or as an AC-DC converter (which can be used as a rectifier/rectifying device, or as an inverter/inverting device), to convert the DC voltage into a single-phase, three-phase, or a multi-phase AC voltage, or to convert the single-phase, three-phase, or the multi-phase AC voltage into a DC voltage, thereby can be used to drive the load accordingly. The exemplary embodiments of the present disclosure will be explained with the help of FIG. 1-FIG. 7.

FIG. 1 is a diagram illustrating a circuit diagram of a five-level converting device (using single-phase as an example) according to a first exemplary embodiment of the present disclosure. As shown in FIG. 1, the five-level converting device 100 includes a AC terminal Vo, a first switch module 110, a second switch module 120, a first flying capacitor module C1, a second flying capacitor module C2 and a bus capacitor module 140.

In FIG. 1, the bus capacitor module 140 has a positive terminal 141, a negative terminal 142 and a neutral terminal 143. The first switch module 110 includes a bidirectional switching circuit 111, wherein the bidirectional switching circuit 111 includes two first switching units 112 and 113 reversely connected in series, a terminal of the first switching unit 113 connects to the neutral terminal 143 of the bus capacitor module 140. Wherein each of the first switching units 112 and 113 includes a power semiconductor switch or a plurality of power semiconductor switches, and the power semiconductor switches connect in series. The second switch module 120 includes second switching units 121 and 122, third switching units 123 and 124, fourth switching units 125 and 126, and fifth switching units 127 and 128, wherein the second switching units 121 and 122 are cascaded; the third, the fourth, and the fifth switching units 123-128 are cascaded and are connected to the bus capacitor module 140 in parallel, wherein the third switching unit 123 connects to the positive terminal 141 of the bus capacitor module 140, the third switching unit 124 connects to the third switching unit 123 in series, the fourth switching unit 125 connects to the third switching unit 124 in series, the fourth switching unit 126 connects to the fourth switching unit 125 in series, the fifth switching unit 127 connects to the fourth switching unit 126 in series, the fifth switching unit 128 connects to the fifth switching unit 127 in series, the fifth switching unit 128 connects to the negative terminal 142 of the bus capacitor module 140, and the fourth switching units 125 and 126 connect to the two second switching units 121 and 122 in parallel, wherein the second switching unit 121 connects to a connection point between the third switching unit 124 and the fourth switching unit 125, the second switching unit 122 connects to a connection point between the fourth switching unit 126 and the fifth switching unit 127; in addition, the connection point between the fourth switching units 125 and 126 connects to the AC terminal Vo, the connection point between the second switching units 121 and 122 connects to a terminal of the first switching unit 112. The first and the second flying capacitor modules C1 and C2 connect across the first switch module 110 and second switch module 120, wherein two terminals of the first switching unit 112 respectively connect to the connection point between the third switching units 123 and 124 and to the connection point between the fifth switching units 127 and 128 through the flying capacitor modules C1 and C2. Each of the flying capacitor modules C1 and C2 can include at least one capacitor, when the amount of the capacitors is more than one, the capacitors can connect in series, in parallel or in series-parallel.

Specifically, a terminal of the first flying capacitor module C1 connects to the connection point (that is, the left terminal of the first switching unit 112 in FIG. 1) between the first switching units 112 and 113; a terminal of the second flying capacitor module C2 connects to the connection point (that is, the right terminal of the first switching unit 112 in FIG. 1) between the first switching unit 112 and the second switching units 121 and 122; between the aforementioned flying capacitor modules C1 and C2 is an interval of the first switching unit 112, thereby the two aforementioned flying capacitor modules C1 and C2 do not directly connect to each other. Another terminal of the first flying capacitor module C1 connects a connection point between the third switching units 123 and 124, and another terminal of the second flying capacitor module C2 connects to a connection point between the two fifth switching units 127 and 128.

In FIG. 1, the first switching units 112 and 113 respectively include the power semiconductor switches S9 and S10, and the second switching units 121 and 122 respectively include the power semiconductor switches D1 and D2. An emitter of the power semiconductor switch S9 connects to an anode of the power semiconductor switch D1 and to a cathode of the power semiconductor switch D2, a collector of the power semiconductor switch S9 connects to a collector of the power semiconductor switch S10, an emitter of the power semiconductor switches S10 connects to the neural terminal 143 of the bus capacitor module 140. Each of the power semiconductor switches S9 and S10 has a diode connected inside, and the diode connected inside and the corresponding power semiconductor switch itself reversely connect in parallel; for example, an anode of the diode connected inside of the power semiconductor switch S9 connects to the emitter of the power semiconductor switch S9, and a cathode of the diode connected inside of the power semiconductor switch S9 connects to the collector of the power semiconductor switch S9. In this exemplary embodiment, each of the first switching units 112 and 113 includes at least one power semiconductor switch, and the at least one power semiconductor switch can be IGBTs, GTO thyristors, IGCTs or other full-controlled power semiconductor elements according to the design requirements. Each of the second switching units 121 and 122 includes at least one power semiconductor switch, and the at least one power semiconductor switches is a diode. When the amount of the at least one power semiconductor switches is more than one, and the power semiconductor switches can connect in series, or the power semiconductor switches can connect in parallel.

The third switching unit 123 includes a single power semiconductor switch S1 for connecting to the positive terminal 141, and the third switching unit 124 includes two power semiconductor switches S2 and S3 connected in series for connecting to the power semiconductor switch S4 in the fourth switching unit 125, wherein electrical characters of the power semiconductor switches S1, S2, S3 and S4 are about the same. Specifically, the collector of the power semiconductor switch S1 connects to the positive terminal 141 of the bus capacitor module 140, the emitter of the power semiconductor switch S1 connects to the collector of the power semiconductor switch S2, the emitter of the power semiconductor switch S2 connects to the collector of the power semiconductor switch S3, the emitter of the power semiconductor switch S3 connects to the collector of the power semiconductor switch S4 and to the cathode of the power semiconductor switch D1, and the emitter of the power semiconductor switches S4 connects to the AC terminal Vo. Each of the power semiconductor switches S1, S2, S3 and S4 has a diode connected inside, the diode connected inside and the corresponding power semiconductor switch itself reversely connect in parallel. In this exemplary embodiment, each of the third switching units 123 and 124 and the fourth switching units 125 and 126 includes at least one power semiconductor switch, and the at least one power semiconductor switch can be IGBTs, GTO thyristors, IGCTs or other full-controlled power semiconductor elements according to the design requirements. When the amount of the at least one power semiconductor switches is more than one, the power semiconductor switches can connect in series, or the power semiconductor switches can connect in parallel.

The fifth switching unit 127 includes a single power semiconductor switch S6 for connecting to the power semiconductor switch S5 in the fourth switching unit 126, the fifth switching unit 128 includes two power semiconductor switches S7 and S8 connected in series for connecting to the negative terminal 142 of the bus capacitor module 140, wherein electrical characters of the power semiconductor switches S5, S6, S7 and S8 are about the same. Specifically, the collector of the power semiconductor switch S5 connects to the AC terminal Vo, the emitter of the power semiconductor switch S5 connects to the collector of the power semiconductor switch S6 and to the anode of the power semiconductor switch D2, the emitter of the power semiconductor switch S6 connects to the collector of the power semiconductor switch S7, the emitter of the power semiconductor switch S7 connects to the collector of the power semiconductor switch S8, and the emitter of the power semiconductor switch S8 connects to the negative terminal 142 of the bus capacitor module 140. Each of the power semiconductor switches S5, S6, S7 and S8 has a diode connected inside, and the diode connected inside and the corresponding power semiconductor switch itself reversely connect in parallel. In this exemplary embodiment, each of the fifth switching units 127 and 128 includes at least one power semiconductor switch, and the at least one power semiconductor switch can be IGBTs, GTO thyristors, IGCTs or other full-controlled power semiconductor elements according to the design requirements. When the amount of the at least one power semiconductor switches is more than one, the power semiconductor switches can connect in series, or the power semiconductor switches can connect in parallel.

Please note that the amounts of the power semiconductor switches in each of the switching units in FIG. 1 are for the illustrative purposes only, and is not meant to be a limitation of the present disclosure, people skilled in this field can choose the amount of the power semiconductor switches and the corresponding withstanding voltages according to the design requirements. For example, the two power semiconductor switches S2 and S3 connected in series can be integrated into a single power semiconductor switch, and the electrical character of that single power semiconductor switch is about the same as the total electrical characters of the power semiconductor switches S2 and S3 combined. The two power semiconductor switches S7 and S8 connected in series can be integrated into a single power semiconductor switch, and the electrical character of that single power semiconductor switch is about the same as the total electrical characters of the power semiconductor switches S7 and S8 combined.

In FIG. 1, for example, the power semiconductor switches D1 and D2 can be diodes, and the power semiconductor switches S1-S10 can be IGBTs, GTO thyristors, IGCTs or other switching elements, according to the design requirements.

The bus capacitor module 140 includes a first bus capacitor module C3 and a second bus capacitor module C4. A terminal of the first bus capacitor module C3 connects to the positive terminal 141, another terminal of the first bus capacitor module C3 connects to the neutral terminal 143; a terminal of the second bus capacitor module C4 connects to the neutral terminal 143, another terminal of the second bus capacitor module C4 connects to the negative terminal 142. Wherein each of the first bus capacitor module C3 and the second bus capacitor module C4 includes at least one capacitor, and when the amount of the at least one capacitor is more than one, the capacitors can connect in series, in parallel or in series-parallel.

Under operation, the first bus capacitor module C3 and the second bus capacitor module C4 can be connected a DC input voltage, and control on-off of the power semiconductor switches S1-S10 respectively by the PWM (Pulse With Modulation) signals, thereby allowing the inverting function of the five-level converter 100 by outputting an AC voltage from the AC terminal Vo. In other exemplary embodiments, the PFM (Pulse Frequency Modulation) signals or the PAM (Pulse Amplitude Modulation) signals can be chose for respectively controlling on-off of the power semiconductor switches S1-S10, thereby allowing the operation of the five-level converter 100.

Under operation, the AC terminal Vo of the five-level converter 100 receives an AC input voltage, and controls on-off of the power semiconductor switches S1-S10 respectively by the PWM (Pulse With Modulation) signals, thereby allowing inverting function of the five-level converter 100 by outputting a DC voltage from the first bus capacitor module C3 and the second bus capacitor module C4.

Figure 7:
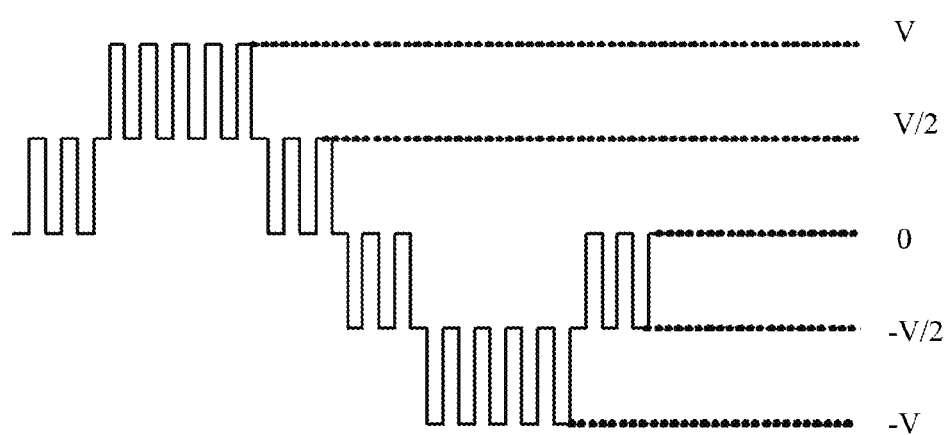
FIG. 7 is a diagram illustrating the voltage waveforms according to the exemplary embodiments of the present disclosure.

For further describe the operations of the five-level converter 100, please refer to table 1, while in operation, a voltage on each of the power semiconductor switches is V/2, and the on-off states corresponding to each voltage on the AC terminal Vo are illustrated as table 1. The "ON" in table 1 means "turns on" and the "OFF" in table 1 means "turns off"; the voltage of the AC terminal Vo comparative to the neutral terminal can be adjusted to V, V/2, 0, −V, −V/2 (i.e., the five voltage levels). In addition, the voltage waveforms of the AC terminal Vo of the five-level converter are illustrated in FIG. 7.

TABLE 1

|  | State 1 | State 2 | State 3 | State 4 | State 5 | State 6 | State 7 | State 8 | State 9 | State 10 |
|---|---|---|---|---|---|---|---|---|---|---|
| S1 | ON | ON | ON | OFF | OFF | OFF | OFF | OFF | OFF | OFF |
| S2 | ON | OFF | OFF | ON | OFF | OFF | OFF | OFF | OFF | OFF |
| S3 | ON | OFF | OFF | ON | OFF | OFF | OFF | OFF | OFF | OFF |
| S4 | ON | ON | ON | ON | ON | ON | ON | ON | OFF | OFF |
| S5 | OFF | ON | ON | OFF | ON | ON | ON | ON | ON | ON |
| S6 | OFF | OFF | OFF | OFF | OFF | OFF | OFF | OFF | ON | ON |
| S7 | OFF | OFF | OFF | OFF | OFF | OFF | ON | ON | OFF | ON |
| S8 | OFF | OFF | OFF | OFF | OFF | OFF | ON | ON | OFF | ON |
| S9 | ON | ON | ON | OFF | ON | ON | OFF | OFF | ON | OFF |
| S10 | OFF | OFF | OFF | ON | ON | ON | OFF | OFF | ON | ON |
| D1 | OFF | ON | OFF | OFF | ON | OFF | ON | OFF | OFF | OFF |
| D2 | OFF | OFF | ON | OFF | OFF | ON | OFF | ON | OFF | OFF |

TABLE 1-continued

|    | State 1 | State 2 | State 3 | State 4 | State 5 | State 6 | State 7 | State 8 | State 9 | State 10 |
|----|---------|---------|---------|---------|---------|---------|---------|---------|---------|----------|
| VO | V       | V/2     | V/2     | V/2     | 0       | 0       | −V/2    | −V/2    | −V/2    | −V       |

Table 1 illustrates an operation mode of the five-level converter 100, however, please note that the five-level converter 100 has many operation modes, table 1 is merely an exemplary embodiment. In addition, the applications of the five-level converter 100 are easily understood by people with ordinary skills in this art, and are not in the scope of the present disclosure, thereby further descriptions are omit for the sake of brevity.

Figure 2:
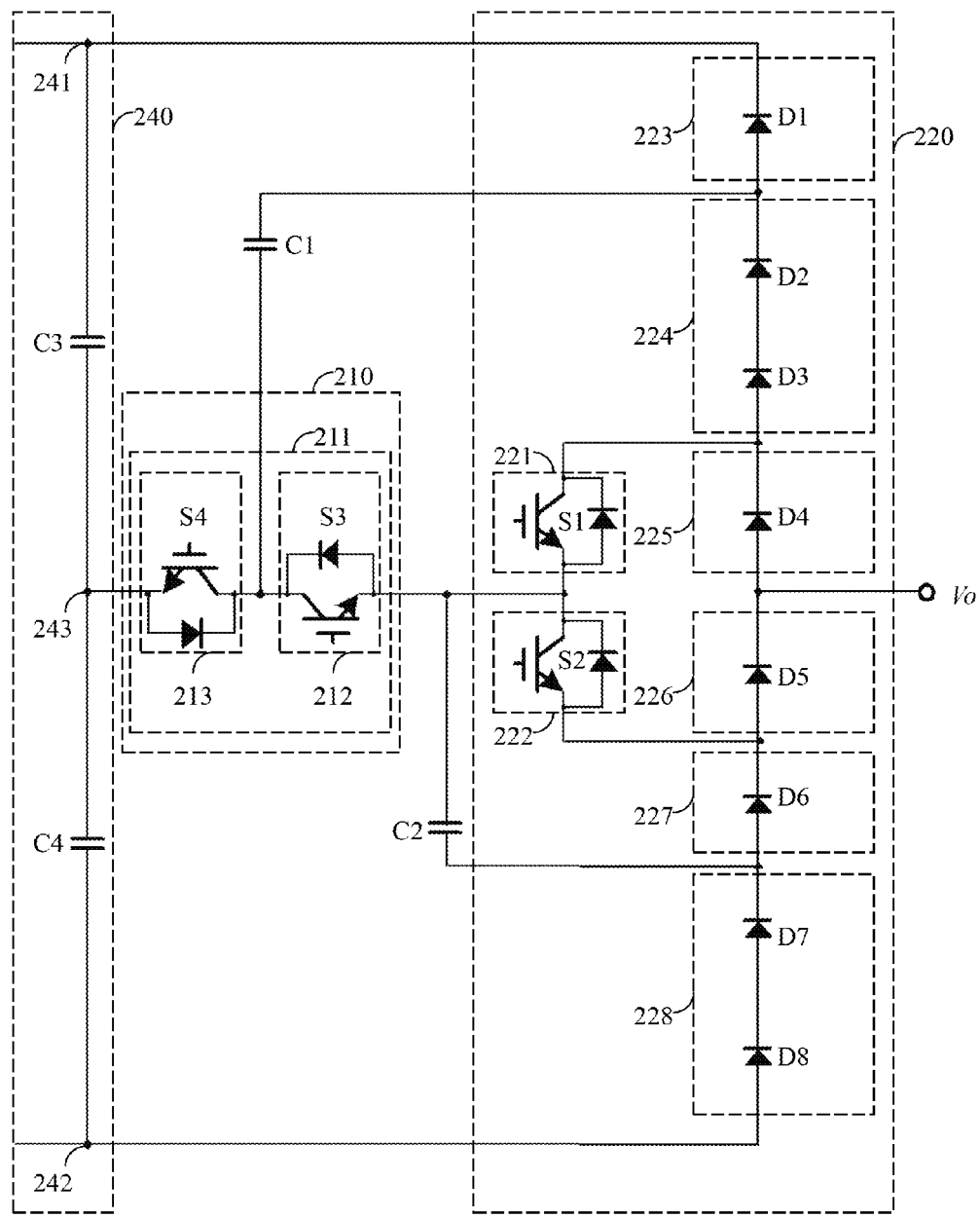
FIG. 2 is a diagram illustrating a circuit diagram of a five-level rectifier according to a second exemplary embodiment of the present disclosure.

FIG. 2 is a diagram illustrating a circuit diagram of a five-level rectifier (using single-phase as an example) according to a second exemplary embodiment of the present disclosure. The structure of the five-level rectifier 200 is similar to that of the five-level converter 100, the difference between the five-level rectifier 200 and the five-level converter 100 is that the power semiconductor switches S1-S8 in FIG. 1 are replaced by the diodes D1-D8 in FIG. 2. As shown in FIG. 2, the five-level rectifier 200 includes an AC terminal Vo, a first switch module 210, a second switch module 220, a first flying capacitor module C1, a second flying capacitor module C2 and a bus capacitor module 240.

In FIG. 2, the bus capacitor module 240 has a positive terminal 241, a negative terminal 242 and a neutral terminal 243. The first switch module 210 includes a bidirectional switching circuit 211, wherein the bidirectional switching circuit 211 includes two first switching units 212 and 213 reversely connected in series, a terminal of the first switching unit 213 connects to the neutral terminal 243 of the bus capacitor module 240. The second switch module 220 includes the second switching units 221 and 222, the third switching units 223 and 224, the fourth switching units 225 and 226 and the fifth switching units 227 and 228, wherein the second switching units 221 and 222 are cascaded, the third, the fourth, and the fifth switching units 223-228 are cascaded and connect to the bus capacitor module 240 in parallel, wherein third switching unit 223 connects to the positive terminal 241 of the bus capacitor module 240, the fifth switching unit 228 connects to the negative terminal 242 of the bus capacitor module 240, the fourth switching units 225 and 226 connect to the two second switching units 221 and 222 in parallel, that is, the second switching unit 221 connects to the fourth switching unit 225 and the third switching unit 224; the second switching unit 222 connects to the fourth switching unit 226 and the fifth switching unit 227, and the second switching unit 221 connects to the second switching unit 222 in series, wherein a connection point between the fourth switching units 225 and 226 connects to the AC terminal Vo, a connection point between the second switching units 221 and 222 connects to a terminal of the first switching unit 212. The first and the second flying capacitor modules C1 and C2 connect across the first switch module 210 and the second switch module 220, wherein two terminals of the first switching unit 212 respectively connect to the connection point between the third switching units 223 and 224 and to the connection point between the fifth switching units 227 and 228 through the flying capacitor modules C1 and C2.

Specifically, a terminal of the first flying capacitor module C1 connects to the connection point (that is, the left terminal of the first switching unit 212 in FIG. 2) between the first switching units 212 and 213; a terminal of the second flying capacitor module C2 connects to the connection point (that is, the right terminal of the first switching unit 212 in FIG. 2) between the second switching units 221 and 222, between the aforementioned flying capacitor modules C1 and C2 is an interval of the first switching unit 212, thereby the two aforementioned flying capacitor modules C1 and C2 do not directly connect to each other. Another terminal of the first flying capacitor module C1 connects a connection point between the third switching units 223 and 224, and another terminal of the second flying capacitor module C2 connects to a connection point between the two fifth switching units 227 and 228.

In FIG. 2, the first switching units 212 and 213 respectively include the power semiconductor switches S3 and S4, and the second switching units 221 and 222 respectively include the power semiconductor switches S1 and S2. An emitter of the power semiconductor switch S3 connects to an emitter of the power semiconductor switch S1 and to a collector of the power semiconductor switch S2, a collector of the power semiconductor switch S3 connects to a collector of the power semiconductor switch S4, and an emitter of the power semiconductor switch S4 connects to the neutral terminal 243. Each of the power semiconductor switches S1-S4 has a diode connected inside, the diode connected inside and the corresponding power semiconductor switch itself reversely connect in parallel; for example, an anode of the diode connected inside of the power semiconductor switch S3 connects to the emitter of the power semiconductor switch S3, and a cathode of the diode connected inside of the power semiconductor switch S3 connects to the collector of the power semiconductor switch S3.

The third switching unit 223 includes a single power semiconductor switch D1 for connecting to the positive terminal 241, and the third switching unit 224 includes two power semiconductor switches D2 and D3 connected in series for connecting to the power semiconductor switch D4 in the fourth switching unit 225, wherein electrical characters of the power semiconductor switches D1, D2, D3 and D4 are about the same. Specifically, a cathode of the power semiconductor switch D1 connects to the positive terminal 241, an anode of the power semiconductor switch D1 connects to the cathode of the power semiconductor switch D2, an anode of the power semiconductor switch D2 connects to the cathode of the power semiconductor switch D3, an anode of the power semiconductor switch D3 connects to the cathode of the power semiconductor switch D4 and to the collector of the power semiconductor switch S1, and an anode of the power semiconductor switch D4 connects to the AC terminal Vo.

The fifth switching unit 227 includes a single power semiconductor switch D6 for connecting to the power semiconductor switch D5 in the fourth switching unit 226, the fifth switching unit 228 includes two power semiconductor switches D7 and D8 connected in series for connecting to the negative terminal 242, wherein electrical characters of the power semiconductor switches D5, D6, D7 and D8 are about the same. Specifically, the cathode of the power semiconductor switch D5 connects to the AC terminal Vo, the anode of the power semiconductor switch D5 connects to the cathode of the power semiconductor switch D6 and to the emitter of the power semiconductor switch S2, the anode of the power semiconductor switch D6 connects to the cathode of the power semiconductor switch D7, the anode of the power semiconductor switch D7 connects to the cathode of the power semiconductor switch S8, and the anode of the power semiconductor switch D8 connects to the negative terminal 242.

In this exemplary embodiment, each of the third, the fourth and the fifth switching units includes at least one power semiconductor switch, and the at least one power semiconductor switch is a diode. When the amount of the at least one power semiconductor switches is more than one, the power semiconductor switches can connect in series, or the power semiconductor switches can connect in parallel. The second switching unit includes at least one power semiconductor switch, and the at least one power semiconductor switch can be an IGBT, a GTO thyristor, an IGCT or other full-controlled power semiconductor elements, according to the design requirements. When the amount of the at least one power semiconductor switches is more than one, the power semiconductor switches can connect in series, or the power semiconductor switches can connect in parallel.

Please note that the amounts of the power semiconductor switches in each of the switching units in FIG. 2 are for the illustrative purposes only, and is not meant to be a limitation of the present disclosure, people skilled in this field can choose the amount of the power semiconductor switches and the corresponding withstanding voltages according to the design requirements. For example, the two power semiconductor switches D2 and D3 connected in series can be integrated into a single power semiconductor switch, and the electrical character of that single power semiconductor switch is about the same as the total electrical characters of the power semiconductor switches D2 and D3 combined. The two power semiconductor switches D7 and D8 connected in series can be integrated into a single power semiconductor switch, and the electrical character of that single power semiconductor switch is about the same as the total electrical characters of the power semiconductor switches D7 and D8 combined.

In FIG. 2, for example, the power semiconductor switches D1-D8 can be diodes, and the power semiconductor switches S1-S4 can be IGBTs, GTO thyristors, IGCTs or other switching elements, according to the design requirements.

The bus capacitor module 240 includes a first bus capacitor module C3 and a second bus capacitor module C4. A terminal of the first bus capacitor module C3 connects to the positive terminal 241, another terminal of the first bus capacitor module C3 connects to the neutral terminal 243; a terminal of the second bus capacitor module C4 connects to the neutral terminal 243, and another terminal of the second bus capacitor module C4 connects to the negative terminal 242.

Under operation, the AC terminal Vo of the five-level rectifier 200 receives an AC input voltage, and control on-off of the power semiconductor switches S1-S4 respectively by the PWM (Pulse With Modulation) signals, thereby allowing rectifying function of the five-level rectifier 200 by outputting a DC voltage from the first bus capacitor module C3 and the second bus capacitor module C4. In other exemplary embodiments, the PFM (Pulse Frequency Modulation) signals or the PAM (Pulse Amplitude Modulation) signals can be chose for respectively controlling on-off of the power semiconductor switches S1-S4, thereby allowing the operation of the five-level rectifier 200.

For further describe the operations of the five-level rectifier 200, please refer to table 2, while in operation, a voltage on each of the power semiconductor switches is V/2, and the on-off states corresponding to each voltage on the AC terminal Vo are illustrated as table 2. The "ON" in table 2 means "turns on" and the "OFF" in table 2 means "turns off"; the voltage of the AC terminal Vo comparative to the neutral terminal can be adjusted to V, V/2, 0, −V, −V/2 (i.e., the five voltage levels). In addition, the voltage waveforms of the AC terminal Vo of the five-level converter are illustrated in FIG. 7.

TABLE 2

|    | State 1 | State 2 | State 3 | State 4 | State 5 | State 6 | State 7 | State 8 |
|----|---------|---------|---------|---------|---------|---------|---------|---------|
| D1 | ON  | OFF | ON  | OFF | OFF | OFF | OFF | OFF |
| D2 | ON  | ON  | OFF | OFF | OFF | OFF | OFF | OFF |
| D3 | ON  | ON  | OFF | OFF | OFF | OFF | OFF | OFF |
| D4 | ON  | ON  | ON  | ON  | OFF | OFF | OFF | OFF |
| D5 | OFF | OFF | OFF | OFF | ON  | ON  | ON  | ON  |
| D6 | OFF | OFF | OFF | OFF | OFF | OFF | ON  | ON  |
| D7 | OFF | OFF | OFF | OFF | OFF | ON  | OFF | ON  |
| D8 | OFF | OFF | OFF | OFF | OFF | ON  | OFF | ON  |
| S1 | OFF | OFF | ON  | ON  | ON  | OFF | OFF | OFF |
| S2 | OFF | OFF | OFF | ON  | ON  | ON  | OFF | OFF |
| S3 | ON  | ON  | ON  | ON  | ON  | OFF | ON  | OFF |
| S4 | OFF | ON  | OFF | ON  | ON  | OFF | ON  | ON  |
| VO | V   | V/2 | V/2 | 0   | 0   | −V/2 | −V/2 | −V  |

Table 2 illustrates an operation mode of the five-level rectifier 200, however, please note that the five-level rectifier 200 has many operation modes, table 2 is merely an exemplary embodiment. In addition, the applications of the five-level rectifier 200 are easily understood by people with ordinary skills in this art, and are not in the scope of the present disclosure, thereby further descriptions are omit for the sake of brevity.

Figure 3:
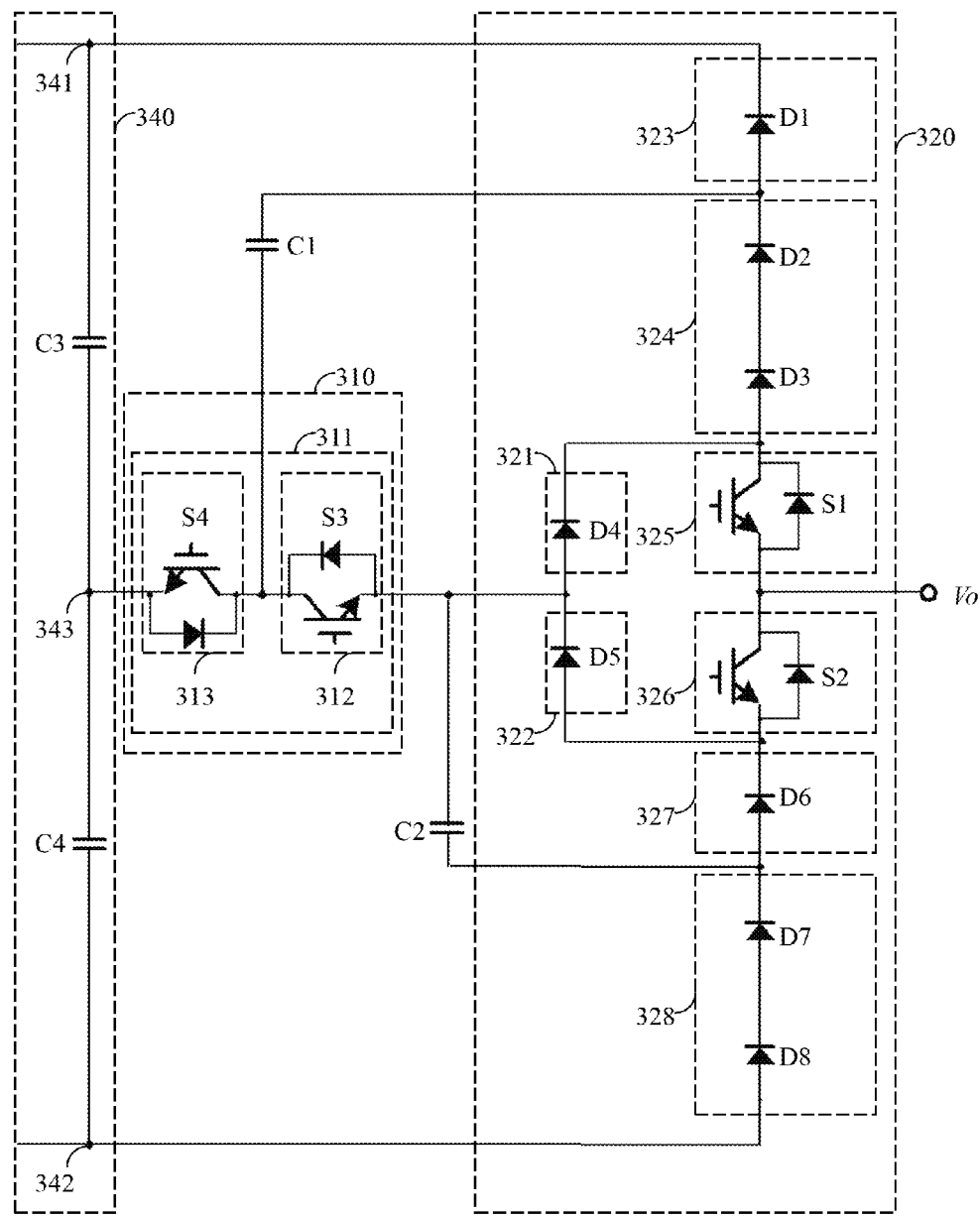
FIG. 3 is a diagram illustrating a circuit diagram of a five-level rectifier according to a third exemplary embodiment of the present disclosure.
Figure 4:
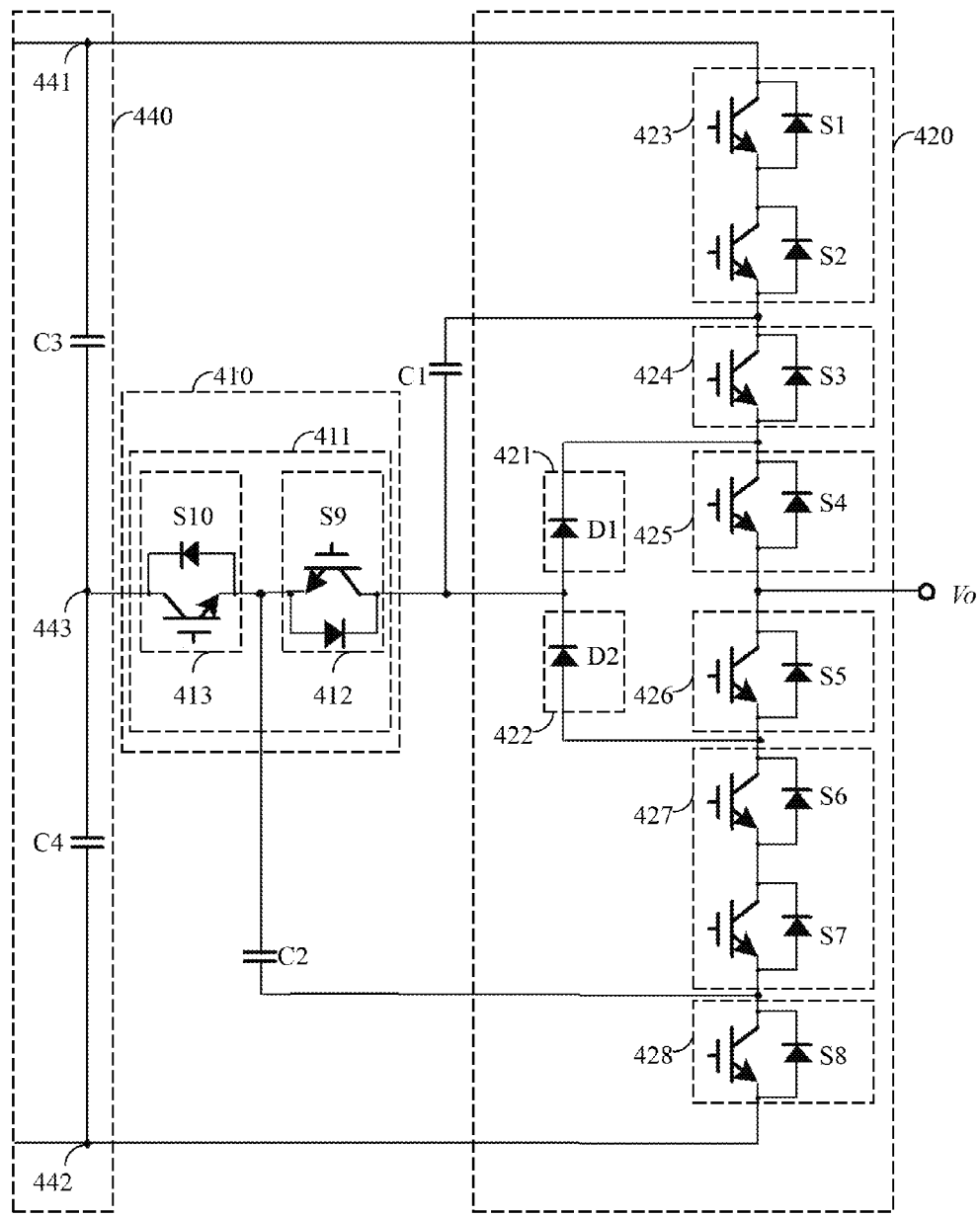
FIG. 4 is a diagram illustrating a circuit diagram of a five-level converting device according to a fourth exemplary embodiment of the present disclosure.

FIG. 3 is a diagram illustrating a circuit diagram of a five-level rectifier (using single-phase as an example) according to a third exemplary embodiment of the present disclosure. The structure of the five-level rectifier 300 is similar to that of the five-level rectifier 200, the difference between the five-level rectifier 300 and the five-level rectifier 200 is that the places of the power semiconductor switches S1-S2 and the places of the power semiconductor switches D1-D2 are exchanged. As shown in FIG. 3; the five-level rectifier 300 includes an AC terminal Vo, a first switch module 310, a second switch module 320, a first flying capacitor module C1, a second flying capacitor module C2 and a bus capacitor module 340.

In FIG. 3, the bus capacitor module 340 has a positive terminal 341, a negative terminal 342 and a neutral terminal 343. The first switch module 310 includes a bidirectional switching circuit 311, wherein the bidirectional switching circuit 311 includes two first switching units 312 and 313 reversely connected in series, and a terminal of the first switching unit 313 connects to the neutral terminal 343 of the bus capacitor module 340. The second switch module 320 includes second switching units 321 and 322, third switching units 323 and 324, fourth switching units 325 and 326, and fifth switching units 327 and 328, wherein the second switching units 321 and 322 are cascaded, the third, the fourth, and the fifth switching units 323-328 are cascaded and connect to the bus capacitor module 340 in parallel; wherein the third switching unit 323 connects to the positive terminal 341 of the bus capacitor module 340, the fifth switching unit 328 connects to the negative terminal 342 of the bus capacitor module 340, the fourth switching units 325 and 326 connect to the two second switching units 321 and 322 in parallel, wherein a connection point between the fourth switching units 325 and 326 connects to the AC terminal Vo, and a connection point between the second switching units 321 and 322 connects to a terminal of the first switching unit 312. The first and the second flying capacitor modules C1 and C2 connect across the first switch module 310 and the second switch module 320, wherein two terminals of the first switching unit 312 respectively connect to the connection point between the third switching units 323 and 324 and to the connection point between the fifth switching units 327 and 328 through the flying capacitor modules C1 and C2.

Specifically, a terminal of the first flying capacitor module C1 connects to the connection point (that is, the left terminal of the first switching unit 312 in FIG. 3) between the first switching units 312 and 313; a terminal of the second flying capacitor module C2 connects to the connection point between the first switching unit 312 and the second switching units 321 and 322; between the aforementioned flying capacitor modules C1 and C2 is an interval of the first switching unit 312, thereby the two aforementioned flying capacitor modules C1 and C2 do not directly connect to each other. Another terminal of the first flying capacitor module C1 connects to a connection point between the third switching units 323 and 324, and another terminal of the second flying capacitor module C2 connects to a connection point between the two fifth switching units 327 and 328.

In FIG. 3, the first switching units 312 and 313 respectively include the power semiconductor switches S3 and S4, and the second switching units 321 and 322 respectively includes the power semiconductor switches D4 and D5. An emitter of the power semiconductor switch S3 connects to an anode of the power semiconductor switch D4 and to a cathode of the power semiconductor switch D5, a collector of the power semiconductor switch S3 connects to a collector of the power semiconductor switch S4, and an emitter of the power semiconductor switch S4 connects to the neutral terminal 343. Each of the power semiconductor switches S3-S4 has a diode connected inside, the diode connected inside and the corresponding power semiconductor switch itself reversely connect in parallel; for example, an anode of the diode connected inside of the power semiconductor switch S3 connects to the emitter of the power semiconductor switch S3, and a cathode of the diode connected inside of the power semiconductor switch S3 connects to the collector of the power semiconductor switch S3.

The third switching unit 323 includes a single power semiconductor switch D1 for connecting to the positive terminal 341, and the third switching unit 324 includes two power semiconductor switches D2 and D3 connected in series for connecting to the power semiconductor switch S1 in the fourth switching unit 325. Specifically, a cathode of the power semiconductor switch D1 connects to the positive terminal 341, an anode of the power semiconductor switches D1 connects to a cathode of the power semiconductor switch D2, an anode of the power semiconductor switch D2 connects to a cathode of the power semiconductor switch D3, an anode of the power semiconductor switch D3 connects to a cathode of the power semiconductor switch D4 and to a collector of the power semiconductor switch S1, and an emitter of the power semiconductor switch S1 connects to the AC terminal Vo.

The fifth switching unit 327 includes a single power semiconductor switch D6 for connecting to the power semiconductor switch S2 in the fourth switching unit 326, the fifth switching unit 328 includes two power semiconductor switches D7 and D8 connected in series for connecting to the negative terminal 343. Specifically, the collector of the power semiconductor switch S2 connects to the AC terminal Vo, an emitter of the power semiconductor switch S2 connects to a cathode of the power semiconductor switch D6 and to an anode of the power semiconductor switch D5, an anode of the power semiconductor switch D6 connects to a cathode of the power semiconductor switch S7, an anode of the power semiconductor switch D7 connects to a cathode of the power semiconductor switch D8, and anode of the power semiconductor switch D8 connects to the negative terminal 342.

In this exemplary embodiment, each of the second, the third, and the fifth switching units includes at least one power semiconductor switch, and the at least one power semiconductor switch is a diode. When the amount of the at least one power semiconductor switches is more than one, the power semiconductor switches can connect in series, or the power semiconductor switches can connect in parallel. The fourth switching unit includes at least one power semiconductor switch, and the at least one power semiconductor switch can be an IGBT, a GTO thyristor, an IGCT or other full-controlled power semiconductor elements, according to the design requirements. When the amount of the at least one power semiconductor switches is more than one, the power semiconductor switches can connect in series, or the power semiconductor switches can connect in parallel.

Please note that the amounts of the power semiconductor switches in each of the switching units in FIG. 3 are for the illustrative purposes only, and is not meant to be a limitation of the present disclosure, people skilled in this field can choose the amount of the power semiconductor switches and the corresponding withstanding voltages according to the design requirements. For example, the two power semiconductor switches D2 and D3 connected in series can be integrated into a single power semiconductor switch, and the electrical character of that single power semiconductor switch is about the same as the total electrical characters of the power semiconductor switches D2 and D3 combined. The two power semiconductor switches D7 and D8 connected in series can be integrated into a single power semiconductor switch, and the electrical character of that single power semiconductor switch is about the same as the total electrical characters of the power semiconductor switches D7 and D8 combined.

In FIG. 3, for example, the power semiconductor switches D1-D8 can be diodes, and the power semiconductor switches S1-S4 can be IGBTs, GTO thyristors, IGCTs or other switching elements, according to the design requirements.

The bus capacitor module 340 includes a first bus capacitor module C3 and a second bus capacitor module C4. A terminal of the first bus capacitor module C3 connects to the positive terminal 341, and another terminal of the first bus capacitor module C3 connects to the neutral terminal 343; a terminal of the second bus capacitor module C4 connects to the neutral terminal 343, and another terminal of the second bus capacitor module C4 connects to the negative terminal 342.

Under operation, the AC terminal Vo of the five-level rectifier 300 receives an AC input voltage, and control on-off of the power semiconductor switches S1-S4 respectively by the PWM (Pulse With Modulation) signals, thereby allowing rectifying function of the five-level rectifier 300 by outputting a DC voltage from the first bus capacitor module C3 and the second bus capacitor module C4. In other exemplary embodiments, the PFM (Pulse Frequency Modulation) signals or the PAM (Pulse Amplitude Modulation) signals can be chose for respectively controlling on-off of the power semiconductor switches S1-34, thereby allowing the operation of the five-level rectifier 300.

For further describe the operations of the five-level rectifier 300, please refer to table 3, while in operation, a voltage on each of the power semiconductor switches is V/2, and the on-off states corresponding to each voltage on the AC terminal Vo are illustrated as table 3. The "ON" in table 3 means "turns on" and the "OFF" in table 3 means "turns off"; the voltage of the AC terminal Vo comparative to the neutral terminal can be adjusted to V, V/2, 0, −V, −V/2 (i.e., the five voltage levels). In addition, the voltage waveforms of the AC terminal Vo of the five-level converter are illustrated in FIG. 7.

TABLE 3

|    | State 1 | State 2 | State 3 | State 4 | State 5 | State 6 | State 7 | State 8 |
|----|---------|---------|---------|---------|---------|---------|---------|---------|
| D1 | ON  | OFF | ON  | OFF | OFF | OFF | OFF | OFF |
| D2 | ON  | ON  | OFF | OFF | OFF | OFF | OFF | OFF |
| D3 | ON  | ON  | OFF | OFF | OFF | OFF | OFF | OFF |
| D4 | OFF | OFF | OFF | ON  | OFF | ON  | OFF | OFF |
| D5 | OFF | OFF | ON  | OFF | ON  | OFF | OFF | ON  |
| D6 | OFF | OFF | OFF | OFF | OFF | OFF | ON  | ON  |
| D7 | OFF | OFF | OFF | OFF | OFF | ON  | OFF | ON  |
| D8 | OFF | OFF | OFF | OFF | OFF | ON  | OFF | ON  |
| S1 | ON  | ON  | OFF | ON  | ON  | ON  | OFF | OFF |
| S2 | OFF | OFF | ON  | ON  | ON  | OFF | ON  | OFF |
| S3 | ON  | ON  | ON  | ON  | ON  | OFF | ON  | OFF |
| S4 | OFF | ON  | OFF | ON  | ON  | ON  | ON  | ON  |
| VO | V   | V/2 | V/2 | 0   | 0   | −V/2 | −V/2 | −V |

Table 3 illustrates an operation mode of the five-level rectifier 300, however, please note that the five-level rectifier 300 has many operation modes, table 3 is merely an exemplary embodiment. In addition, the applications of the five-level rectifier 300 are easily understood by people with ordinary skills in this art, and are not in the scope of the present disclosure, thereby further descriptions are omit for the sake of brevity.

FIG. 4 is a diagram illustrating a circuit diagram of a five-level converting device (using single-phase as an example) according to a fourth exemplary embodiment of the present disclosure. The structure of the five-level converter 400 is similar to that of the five-level rectifier 100 in FIG. 1, the difference between the five-level converter 400 and the five-level rectifier 100 is that the connections of the power semiconductor switches S9-S10 and the connections of the flying capacitor modules C1-C2 are changed. As shown in FIG. 4; the five-level converter 400 includes an AC terminal Vo, a first switch module 410, a second switch module 420, a first flying capacitor module C1, a second flying capacitor module C2 and a bus capacitor module 440.

In FIG. 4, the bus capacitor module 440 has a positive terminal 441, a negative terminal 442 and a neutral terminal 443. The first switch module 410 includes a bidirectional switching circuit 411, wherein the bidirectional switching circuit 411 includes two first switching units 412 and 413 reversely connected in series, a terminal of the first switching unit 413 connects to the neutral terminal 443 of the bus capacitor module 440. The second switch module 420 includes second switching units 421 and 422, third switching units 423 and 424, fourth switching units 425 and 426, and fifth switching units 427 and 428, wherein the second switching units 421 and 422 are cascaded, the third, the fourth, and the fifth switching units 423-428 are cascaded and connect to the bus capacitor module 440 in parallel, wherein the third switching unit 423 connects to the positive terminal 441 of the bus capacitor module 440, the fifth switching unit 428 connects to the negative terminal 442 of the bus capacitor module 440, the fourth switching units 425 and 426 connect to the two second switching units 421 and 422 in parallel, wherein a connection point between the fourth switching units 425 and 426 connects to the AC terminal Vo, a connection point between the second switching units 421 and 422 connects to a terminal of the first switching unit 412. The first and the second flying capacitor modules C1 and C2 connect across the first switch module 410 and the second switch module 420, wherein two terminals of the first switching unit 412 respectively connect to the connection point between the third switching units 423 and 424 and to the connection point between the fifth switching units 427 and 428 through the flying capacitor modules C1 and C2.

Specifically, a terminal of the second flying capacitor module C2 connects to the connection point (that is, the left terminal of the first switching unit 412 in FIG. 4) between the first switching units 412 and 413; a terminal of the first flying capacitor module C1 connects to the connection point between the first switching unit 412 and the second switching units 421 and 422, between the aforementioned flying capacitor modules C1 and C2 is an interval of the first switching unit 412, thereby the two aforementioned flying capacitor modules C1 and C2 do not directly connect to each other. Another terminal of the first flying capacitor module C1 connects to the connection point between the third switching units 423 and 424, and another terminal of the second flying capacitor module C2 connects to the connection point between the two fifth switching units 427 and 428.

In FIG. 4, the first switching units 412 and 413 respectively include power semiconductor switches S9 and S10, the second switching units 421 and 422 respectively includes power semiconductor switches D1 and D2. A collector of the power semiconductor switch S9 connects to an anode of the power semiconductor switch D1 and to a cathode of the power semiconductor switch D2, an emitter of the power semiconductor switch S9 connects to an emitter of the power semiconductor switch S10, a collector of the power semiconductor switch S10 connects to the neutral terminal 443. Each of the power semiconductor switches S9-S10 has a diode connected inside, the diode connected inside and the corresponding power semiconductor switch itself reversely connect in parallel; for example, an anode of the diode connected inside of the power semiconductor switch S9 connects to the emitter of the power semiconductor switch S9, and a cathode of the diode connected inside of the power semiconductor switch S9 connects to the collector of the power semiconductor switch S9.

The third switching unit 423 includes two power semiconductor switches S1 and S2 connected in series for connecting to the positive terminal 441, and the third switching unit 424 includes a single power semiconductor switch S3 for connecting to the connects to the power semiconductor switch S4 in the fourth switching unit 425, wherein electrical characters of the power semiconductor switches S1, S2, S3 and S4 are about the same. Specifically, the collector of the power semiconductor switch S1 connects to the positive terminal 441, the emitter of the power semiconductor switch S1 connects to the collector of the power semiconductor switch S2, the emitter of the power semiconductor switch S2 connects to the collector of the power semiconductor switch S3, the emitter of the power semiconductor switch S3 connects to the collector of the power semiconductor switch S4 and to the cathode of the power semiconductor switch D1, and the emitter of the power semiconductor switch S4 connects to the AC terminal Vo. Each of the power semiconductor switches S1, S2, S3 and S4 has a diode connected inside, and the diode connected inside and the corresponding power semiconductor switch itself reversely connect in parallel.

The fifth switching unit 427 includes two power semiconductor switches S6 and S7 connected in series for connecting to the power semiconductor switch S5 in the fourth switching unit 426, the fifth switching unit 428 includes a single power semiconductor switch S8 for connecting to the negative terminal 442, wherein the electrical characters of the power semiconductor switches S5, S6, S7 and S8 are about the same. Specifically, the collector of the power semiconductor switch S5 connects to the AC terminal Vo, the emitter of the power semiconductor switch S5 connects to the collector of the power semiconductor switch S6 and to the anode of the power semiconductor switch D2, the emitter of the power semiconductor switch S6 connects to the collector of the power semiconductor switch S7, the emitter of the power semiconductor switch S7 connects to the collector of the power semiconductor switch S8, the emitter of the power semiconductor switch S8 connects to the negative terminal 442. Each of the power semiconductor switches S5, S6, S7 and S8 has a diode connected inside, and the diode connected inside and the corresponding power semiconductor switch itself reversely connect in parallel.

In this exemplary embodiment, each of the third, the fourth, and the fifth switching units includes at least one power semiconductor switch, and the at least one power semiconductor switch can be IGBTs, GTO thyristors, IGCTs or other full-controlled power semiconductor elements according to the design requirements. When the amount of the at least one power semiconductor switches is more than one, the power semiconductor switches can connect in series, or the power semiconductor switches can connect in parallel. The second switching unit includes at least one power semiconductor switch, and the at least one power semiconductor switch is a diode. When the amount of the at least one power semiconductor switches is more than one, the power semiconductor switches can connect in series, or the power semiconductor switches can connect in parallel.

Please note that the amounts of the power semiconductor switches in each of the switching units in FIG. 4 are for the illustrative purposes only, and is not meant to be a limitation of the present disclosure, people skilled in this field can choose the amount of the power semiconductor switches and the corresponding withstanding voltages according to the design requirements. For example, the two power semiconductor switches S1 and S2 connected in series can be integrated into a single power semiconductor switch, and the electrical character of that single power semiconductor switch is about the same as the total electrical characters of the power semiconductor switches S1 and S2 combined. The two power semiconductor switches S6 and S7 connected in series can be integrated into a single power semiconductor switch, and the electrical character of that single power semiconductor switch is about the same as the total electrical characters of the power semiconductor switches S6 and S7 combined.

In FIG. 4, for example, the power semiconductor switches D1 and D2 can be diodes, and the power semiconductor switches S1-S10 can be IGBTs, GTO thyristors, IGCTs or other switching elements, according to the design requirements.

The bus capacitor module 440 includes a first bus capacitor module C3 and a second bus capacitor module C4. A terminal of the first bus capacitor module C3 connects to the positive terminal 441, another terminal of the first bus capacitor module C3 connects to the neutral terminal 443; a terminal of the second bus capacitor module C4 connects to the neutral terminal 443, and another terminal of the second bus capacitor module C4 connects to the negative terminal 442.

Under operation, the first bus capacitor module C3 and the second bus capacitor module C4 receives a DC input voltage, and control on-off of the power semiconductor switches S1-S10 respectively by the PWM (Pulse With Modulation) signals, thereby allowing the inverting function of the five-level converter 400 by outputting an AC voltage from the AC terminal Vo. In other exemplary embodiments, the PFM (Pulse Frequency Modulation) signals or the PAM (Pulse Amplitude Modulation) signals can be chose for respectively controlling on-off of the power semiconductor switches S1-S10, thereby allowing the operation of the five-level converter 400.

Under operation, the AC terminal Vo of the five-level converter 400 receives an AC input voltage, and controls on-off of the power semiconductor switches S1-S10 respectively by the PWM (Pulse With Modulation) signals, thereby allowing rectifying function of the five-level converter 400 by outputting a DC voltage from the first bus capacitor module C3 and the second bus capacitor module C4.

For further describe the operations of the five-level converter 400, please refer to table 4, while in operation, a voltage on each of the power semiconductor switches is V/2, and the on-off states corresponding to each voltage on the AC terminal Vo are illustrated as table 4. The "ON" in table 4 means "turns on" and the "OFF" in table 4 means "turns off"; the voltage of the AC terminal Vo comparative to the neutral terminal can be adjusted to V, V/2, 0, −V, −V/2 (i.e., the five voltage levels). In addition, the voltage waveforms of the AC terminal Vo of the five-level converter are illustrated in FIG. 7.

TABLE 4

|  | State 1 | State 2 | State 3 | State 4 | State 5 | State 6 | State 7 | State 8 |
|---|---|---|---|---|---|---|---|---|
| S1 | ON | ON | ON | OFF | OFF | OFF | OFF | OFF | OFF | OFF |
| S2 | ON | ON | OFF | OFF | OFF | OFF | OFF | OFF | OFF | OFF |
| S3 | ON | OFF | OFF | ON | OFF | OFF | OFF | OFF | OFF | OFF |
| S4 | ON | ON | ON | ON | ON | ON | ON | ON | OFF | OFF |
| S5 | OFF | ON | ON | OFF | ON | ON | ON | ON | ON | ON |
| S6 | OFF | OFF | OFF | OFF | OFF | OFF | OFF | OFF | ON | ON |
| S7 | OFF | OFF | OFF | OFF | OFF | OFF | OFF | OFF | ON | ON |
| S8 | OFF | OFF | OFF | OFF | OFF | OFF | ON | ON | OFF | ON |
| S9 | OFF | OFF | OFF | ON | ON | ON | ON | ON | ON | ON |
| S10 | ON | ON | ON | ON | ON | ON | OFF | OFF | ON | OFF |

TABLE 4-continued

|    | State 1 | State 2 |     | State 3 | State 4 | State 5 | State 6 | State 7 |     | State 8 |
| --- | --- | --- | --- | --- | --- | --- | --- | --- | --- | --- |
| D1 | OFF | ON | OFF | OFF | ON | OFF | ON | OFF | OFF | OFF |
| D2 | OFF | OFF | ON | OFF | OFF | ON | OFF | ON | OFF | OFF |
| VO | V | V/2 | V/2 | V/2 | 0 | 0 | −V/2 | −V/2 | −V/2 | −V |

Table 4 illustrates an operation mode of the five-level converter 400, however, please note that the five-level converter 400 has many operation modes, table 4 is merely an exemplary embodiment. In addition, the applications of the five-level converter 400 are easily understood by people with ordinary skills in this art, and are not in the scope of the present disclosure, thereby further descriptions are omit for the sake of brevity.

Figure 5:
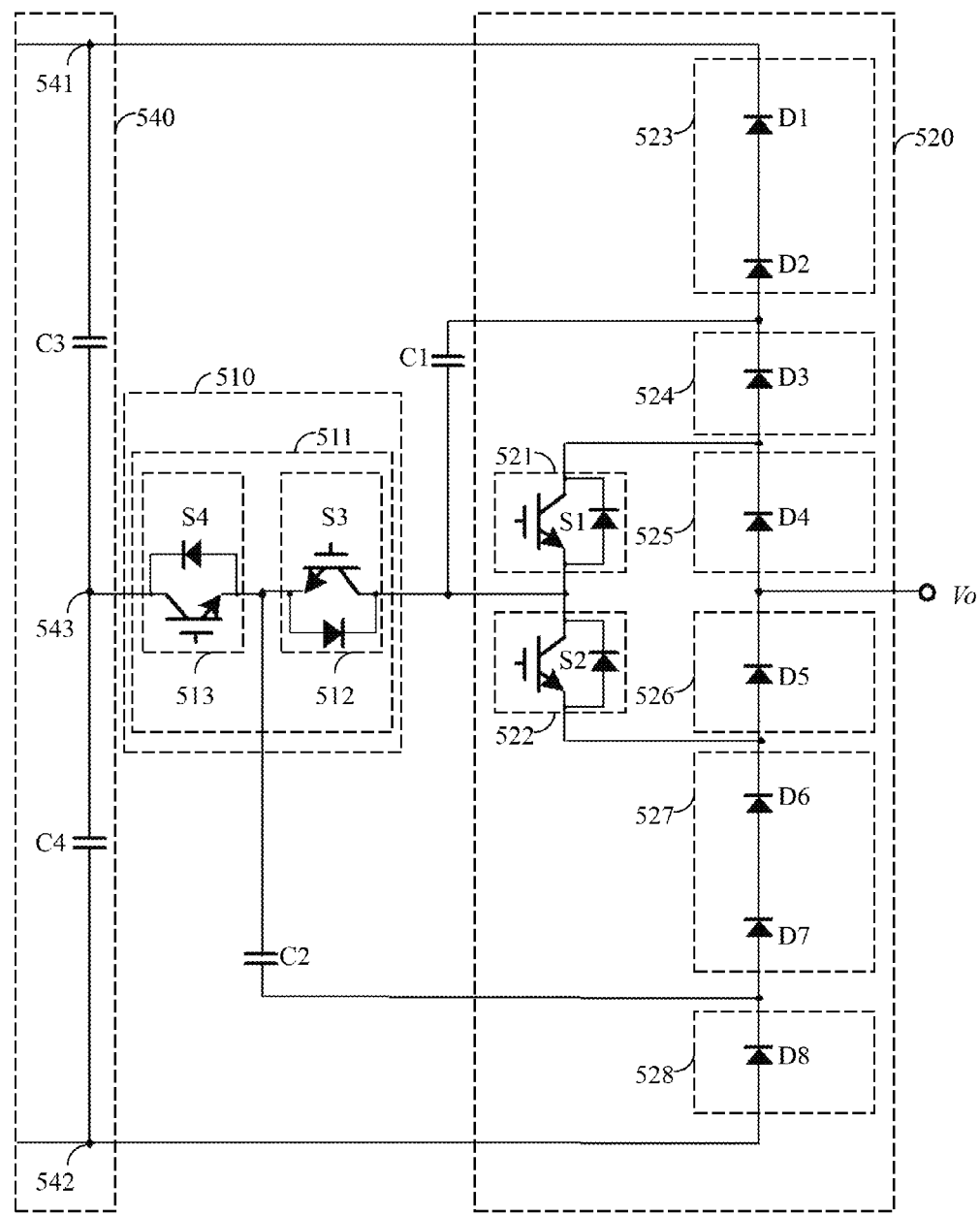
FIG. 5 is a diagram illustrating a circuit diagram of a five-level rectifier according to a fifth exemplary embodiment of the present disclosure.

FIG. 5 is a diagram illustrating a circuit diagram of a five-level rectifier (using single-phase as an example) according to a fifth exemplary embodiment of the present disclosure. The structure of the five-level rectifier 500 is similar to that of the five-level converter 400, the difference between the five-level rectifier 500 and the five-level converter 400 is that the power semiconductor switches S1-S8 in FIG. 4 are replaced by the diodes D1-D8 in FIG. 5, and the diodes D1-D2 in FIG. 4 are replaced by the power semiconductor switches S1-S8 in FIG. 5. As shown in FIG. 5, the five-level rectifier 500 includes an AC terminal Vo, a first switch module 510, a second switch module 520, a first flying capacitor module C1, a second flying capacitor module C2 and a bus capacitor module 540.

In FIG. 5, the bus capacitor module 540 has a positive terminal 541, a negative terminal 542 and a neutral terminal 543. The first switch module 510 includes a bidirectional switching circuit 511, wherein the bidirectional switching circuit 511 includes two first switching units 512 and 513 reversely connected in series, and a terminal of the first switching unit 513 connects to the neutral terminal 543 of the bus capacitor module 540. The second switch module 520 includes second switching units 521 and 522, third switching units 523 and 524, fourth switching units 525 and 526, and fifth switching units 527 and 528, wherein second switching unit 521 and 522 are cascaded, the third, the fourth, and the fifth switching units 523-528 are cascaded and connect to the bus capacitor module 540 in parallel, wherein the third switching unit 523 connects to the positive terminal 541 of the bus capacitor module 540, the fifth switching unit 528 connects to the negative terminal 542 of the bus capacitor module 540, the fourth switching units 525 and 526 connect to the two second switching units 521 and 522 in parallel, wherein a connection point between the fourth switching units 525 and 526 connects to the AC terminal Vo, a connection point between the second switching units 521 and 522 connects to a terminal of the first switching unit 512. The first and the second flying capacitor modules C1 and C2 connect across the first switch module 510 and the second switch module 520, wherein two terminals of the first switching unit 512 respectively connect to the connection point between the third switching unit 523 and 524 and to the connection point between the fifth switching units 527 and 528 through the flying capacitor modules C1 and C2.

Specifically, a terminal of the second flying capacitor module C2 connects to the connection point (that is, the left terminal of the first switching unit 512 in FIG. 5) between the first switching units 512 and 513; a terminal of the first flying capacitor module C1 connects to the connection point between the first switching units 512 and the second switching units 521 and 522, between the aforementioned flying capacitor modules C1 and C2 is an interval of the first switching unit 512, thereby the two aforementioned flying capacitor modules C1 and C2 do not directly connect to each other. Another terminal of the first flying capacitor module C1 connects a connection point between the third switching units 523 and 524, and another terminal of the second flying capacitor module C2 connects to a connection point between the two fifth switching units 527 and 528.

In FIG. 5, the first switching units 512 and 513 respectively include the power semiconductor switches S3 and S4, the second switching units 521 and 522 respectively include the power semiconductor switches S1 and S2. A collector of the power semiconductor switch S3 connects to an emitter of the power semiconductor switch S1 and to a collector of the power semiconductor switch S2, an emitter of the power semiconductor switch S3 connects to an emitter of the power semiconductor switch S4, and a collector of the power semiconductor switch S4 connects to the neutral terminal 543. Each of the power semiconductor switches S1-S4 has a diode connected inside, the diode connected inside and the corresponding power semiconductor switch itself reversely connect in parallel; for example, an anode of the diode connected inside of the power semiconductor switch S3 connects to the emitter of the power semiconductor switch S3, and a cathode of the diode connected inside of the power semiconductor switch S3 connects to the collector of the power semiconductor switch S3.

The third switching unit 523 includes two power semiconductor switches D1 and D2 connected in series for connecting to the positive terminal 541, and the third switching unit 524 includes a single power semiconductor switch D3 for connecting to the power semiconductor switch D4 in the fourth switching unit 525, wherein electrical characters of the power semiconductor switches D1, D2, D3 and D4 are about the same. Specifically, a cathode of the power semiconductor switch D1 connects to the positive terminal 541, an anode of the power semiconductor switch D1 connects to the cathode of the power semiconductor switch D2, an anode of the power semiconductor switch D2 connects to the cathode of the power semiconductor switch D3, an anode of the power semiconductor switch D3 connects to the cathode of the power semiconductor switch D4 and to the collector of the power semiconductor switch S1, and an anode of the power semiconductor switch D4 connects to the AC terminal Vo.

The fifth switching unit 527 includes two power semiconductor switches D6 and D7 connected in series for connecting to the power semiconductor switch D5 in the fourth switching unit 526, and the fifth switching unit 528 includes a single power semiconductor switches D8 for connecting to the negative terminal 542, wherein electrical characters of the power semiconductor switches D5, D6, D7 and D8 are about the same. Specifically, the cathode of the power semiconductor switch D5 connects to the AC terminal Vo, the anode of the power semiconductor switch D5 connects to the cathode of the power semiconductor switch D6 and to the emitter of the power semiconductor switch S2, the anode of the power semiconductor switch D6 connects to the cathode of the power semiconductor switch D7, the anode of the power semiconductor switch D7 connects to the cathode of the power semiconductor switch S8, and the anode of the power semiconductor switch D8 connects to the negative terminal 542.

In this exemplary embodiment, each of the third, the fourth and the fifth switching units includes at least one power semiconductor switch, and the at least one power semiconductor switch is a diode. When the amount of the at least one power semiconductor switches is more than one, the power semiconductor switches can connect in series, or the power semiconductor switches can connect in parallel. The second switching unit includes at least one power semiconductor switch, and the at least one power semiconductor switch can be an IGBT, a GTO thyristor, an IGCT or other full-controlled power semiconductor elements, according to the design requirements. When the amount of the at least one power semiconductor switches is more than one, the power semiconductor switches can connect in series, or the power semiconductor switches can connect in parallel.

Please note that the amounts of the power semiconductor switches in each of the switching units in FIG. 5 are for the illustrative purposes only, and is not meant to be a limitation of the present disclosure, people skilled in this field can choose the amount of the power semiconductor switches and the corresponding withstanding voltages according to the design requirements. For example, the two power semiconductor switches D1 and D2 connected in series can be integrated into a single power semiconductor switch, and the electrical character of that single power semiconductor switch is about the same as the total electrical characters of the power semiconductor switches D1 and D2 combined. The two power semiconductor switches D6 and D7 connected in series can be integrated into a single power semiconductor switch, and the electrical character of that single power semiconductor switch is about the same as the total electrical characters of the power semiconductor switches D6 and D7 combined.

In FIG. 5, for example, the power semiconductor switches D1-D8 can be diodes, and the power semiconductor switches S1-S4 can be IGBTs, GTO thyristors, IGCTs or other switching elements, according to the design requirements.

The bus capacitor module 540 includes a first bus capacitor module C3 and a second bus capacitor module C4. A terminal of the first bus capacitor module C3 connects to the positive terminal 541, another terminal of the first bus capacitor module C3 connects to the neutral terminal 543; a terminal of the second bus capacitor module C4 connects to the neutral terminal 543, and another terminal of the second bus capacitor module C4 connects to the negative terminal 542.

Under operation, the AC terminal Vo of the five-level rectifier 500 receives an AC input voltage, and control on-off of the power semiconductor switches S1-S4 respectively by the PWM (Pulse With Modulation) signals, thereby allowing rectifying function of the five-level rectifier 500 by outputting a DC voltage from the first bus capacitor module C3 and the second bus capacitor module C4. In other exemplary embodiments, the PFM (Pulse Frequency Modulation) signals or the PAM (Pulse Amplitude Modulation) signals can be chose for respectively controlling on-off of the power semiconductor switches S1-S4, thereby allowing the operation of the five-level rectifier 500.

For further describe the operations of the five-level rectifier 500, please refer to table 5, while in operation, a voltage on each of the power semiconductor switches is V/2, and the on-off states corresponding to each voltage on the AC terminal Vo are illustrated as table 5. The "ON" in table 5 means "turns on" and the "OFF" in table 5 means "turns off"; the voltage of the AC terminal Vo comparative to the neutral terminal can be adjusted to V, V/2, 0, −V, −V/2 (i.e., the five voltage levels). In addition, the voltage waveforms of the AC terminal Vo of the five-level converter are illustrated in FIG. 7.

TABLE 5

|    | State 1 | State 2 | State 3 | State 4 | State 5 | State 6 | State 7 | State 8 |
|----|---------|---------|---------|---------|---------|---------|---------|---------|
| D1 | ON      | OFF     | ON      | OFF     | OFF     | OFF     | OFF     | OFF     |
| D2 | ON      | OFF     | ON      | OFF     | OFF     | OFF     | OFF     | OFF     |
| D3 | ON      | ON      | OFF     | OFF     | OFF     | OFF     | OFF     | OFF     |
| D4 | ON      | ON      | ON      | ON      | OFF     | OFF     | OFF     | OFF     |
| D5 | OFF     | OFF     | OFF     | OFF     | ON      | ON      | ON      | ON      |
| D6 | OFF     | OFF     | OFF     | OFF     | OFF     | OFF     | ON      | ON      |
| D7 | OFF     | OFF     | OFF     | OFF     | OFF     | OFF     | ON      | ON      |
| D8 | OFF     | OFF     | OFF     | OFF     | OFF     | ON      | OFF     | ON      |
| S1 | OFF     | OFF     | ON      | ON      | ON      | OFF     | OFF     | OFF     |
| S2 | OFF     | OFF     | OFF     | ON      | ON      | ON      | OFF     | OFF     |
| S3 | OFF     | ON      | OFF     | ON      | ON      | ON      | ON      | ON      |
| S4 | ON      | ON      | ON      | ON      | ON      | OFF     | ON      | OFF     |
| VO | V       | V/2     | V/2     | 0       | 0       | −V/2    | −V/2    | −V      |

Table 5 illustrates an operation mode of the five-level rectifier 500, however, please note that the five-level rectifier 500 has many operation modes, table 5 is merely an exemplary embodiment. In addition, the applications of the five-level rectifier 500 are easily understood by people with ordinary skills in this art, and are not in the scope of the present disclosure, thereby further descriptions are omit for the sake of brevity.

Figure 6:
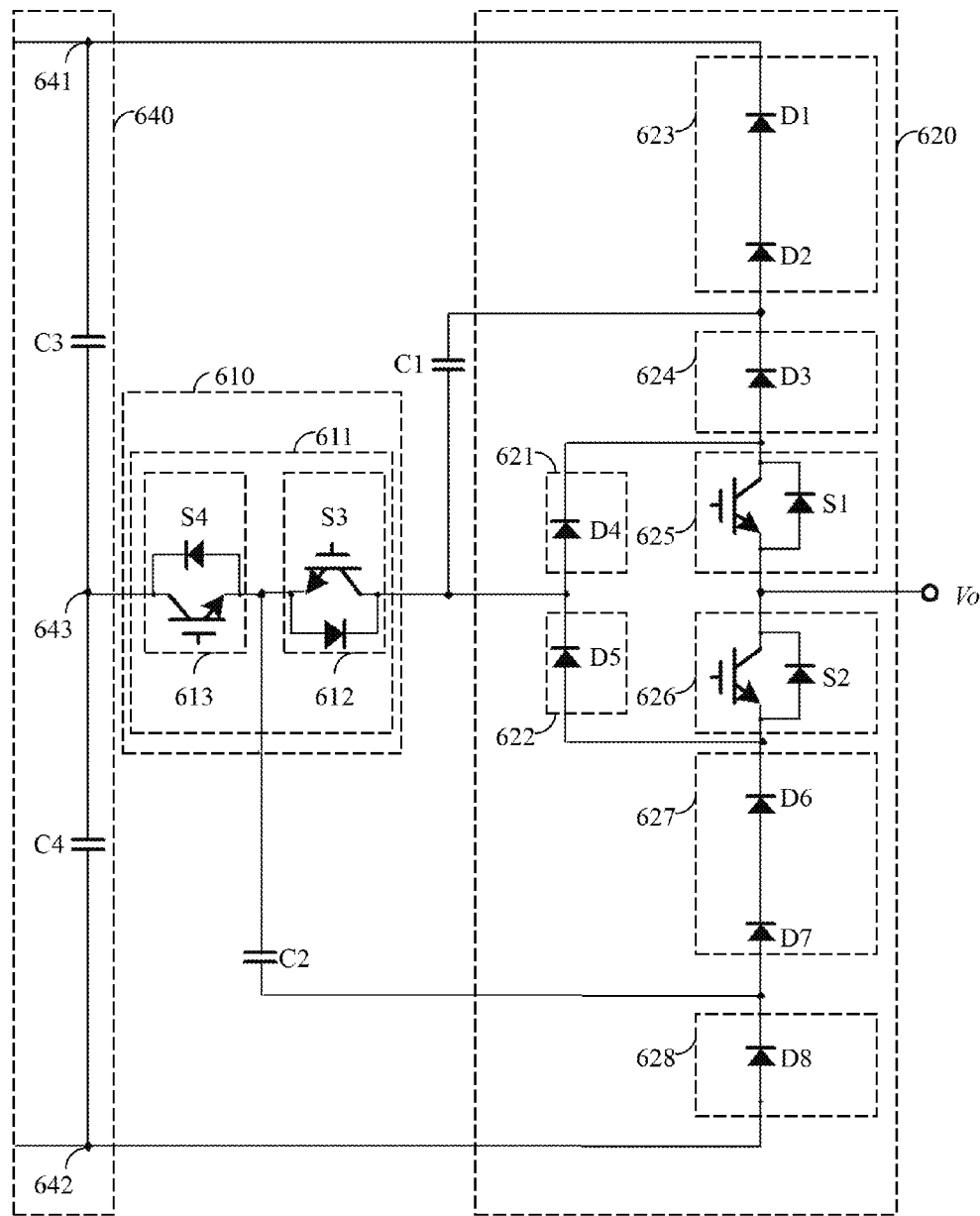
FIG. 6 is a diagram illustrating a circuit diagram of a five-level rectifier according to a sixth exemplary embodiment of the present disclosure.

FIG. 6 is a diagram illustrating a circuit diagram of a five-level rectifier (using single-phase as an example) according to a sixth exemplary embodiment of the present disclosure. The structure of the five-level rectifier 600 is similar to that of the five-level rectifier 500, the difference between the five-level rectifier 600 and the five-level rectifier 500 is that the places of the power semiconductor switches S1-S2 and the places of the power semiconductor switches D1-D2 are exchanged. As shown in FIG. 6; the five-level rectifier 600 includes an AC terminal Vo, a first switch module 610, a second switch module 620, a first flying capacitor module C1, a second flying capacitor module C2 and a bus capacitor module 640.

In FIG. 6, the bus capacitor module 640 has a positive terminal 641, a negative terminal 642 and a neutral terminal 643. The first switch module 610 includes a bidirectional switching circuit 611, wherein the bidirectional switching circuit 611 includes two first switching units 612 and 613 reversely connected in series, and a terminal of the first switching unit 613 connects to the neutral terminal 643 of the bus capacitor module 640. The second switch module 620 includes second switching units 621 and 622, third switching units 623 and 624, fourth switching units 625 and 626 and fifth switching units 627 and 628, wherein the second switching units 621 and 622 are cascaded; the third, the fourth, and the fifth switching units 623-628 are cascaded, and connect to the bus capacitor module 640 in parallel, wherein the third switching unit 623 connects to the positive terminal 641 of the bus capacitor module 640, the fifth switching unit 628 connects to the negative terminal 642 of the bus capacitor module 640, the fourth switching units 625 and 626 connect to the two second switching units 621 and 622 in parallel, wherein a connection point between the fourth switching units 625 and 626 connects to the AC terminal Vo, and a connection point between the second switching units 621 and 622 connects to a terminal of the first switching unit 612. The first and the second flying capacitor modules C1 and C2 connect across the first switch module 610 and the second switch module 620, wherein two terminals of the first switching unit 612 respectively connect to the connection point between the third switching units 623 and 624 and to the connection point between the fifth switching units 627 and 628 through the flying capacitor modules C1 and C2.

Specifically, a terminal of the second flying capacitor module C2 connects to the connection point (that is, the left terminal of the first switching unit 612 in FIG. 6) between the first switching units 612 and 613; a terminal of the first flying capacitor module C1 connects to the connection point between the first switching unit 612 and the second switching units 621 and 622, between the aforementioned flying capacitor modules C1 and C2 is an interval of the first switching unit 612, thereby the two aforementioned flying capacitor modules C1 and C2 do not directly connect to each other. Another terminal of the first flying capacitor module C1 connects to a connection point between the third switching units 623 and 624; another terminal of the second flying capacitor module C2 connects to a connection point between the two fifth switching units 627 and 628.

In FIG. 6; the first switching units 612 and 613 respectively includes power semiconductor switches S3 and S4, and the second switching units 621 and 622 respectively includes power semiconductor switches D4 and D5. A collector of the power semiconductor switch S3 connects to an anode of the power semiconductor switch D4 and to a cathode of the power semiconductor switch D5, an emitter of the power semiconductor switch S3 connects to an emitter of the power semiconductor switch S4, and a collector of the power semiconductor switch S4 connects to the neutral terminal 643. Each of the power semiconductor switches S1-S4 has a diode connected inside, the diode connected inside and the corresponding power semiconductor switch itself reversely connect in parallel; for example, an anode of the diode connected inside of the power semiconductor switch S3 connects to the emitter of the power semiconductor switch S3, and a cathode of the diode connected inside of the power semiconductor switch S3 connects to the collector of the power semiconductor switch S3.

The third switching unit 623 includes two power semiconductor switches D1 and D2 connected in series for connecting to the positive terminal 641, and the third switching unit 624 includes a single power semiconductor switch D3 for connecting to the power semiconductor switch S1 in the fourth switching unit 625. Specifically, a cathode of the power semiconductor switch D1 connects to the positive terminal 641, an anode of the power semiconductor switches D1 connects to a cathode of the power semiconductor switch D2, an anode of the power semiconductor switch D2 connects to a cathode of the power semiconductor switch D3, an anode of the power semiconductor switch D3 connects to a cathode of the power semiconductor switch D4 and to a collector of the power semiconductor switch S1, and an emitter of the power semiconductor switch S1 connects to the AC terminal Vo.

The fifth switching unit 627 includes two power semiconductor switches D6 and D7 connected in series for connecting to the power semiconductor switch S2 in the fourth switching unit 626, and the fifth switching unit 628 includes a single power semiconductor switch D8 for connecting to the negative terminal 642. Specifically, the collector of the power semiconductor switch S2 connects to the AC terminal Vo, the emitter of the power semiconductor switch S2 connects to the cathode of the power semiconductor switch D6 and to the anode of the power semiconductor switch D5, the anode of the power semiconductor switch D6 connects to the cathode of the power semiconductor switch D7, the anode of the power semiconductor switch D7 connects to the cathode of the power semiconductor switch D8, and the anode of the power semiconductor switch D8 connects to the negative terminal 642.

In this exemplary embodiment, each of the second, the third, and the fifth switching units includes at least one power semiconductor switch, and the at least one power semiconductor switch is a diode. When the amount of the at least one power semiconductor switches is more than one, the power semiconductor switches can connect in series, or the power semiconductor switches can connect in parallel. The fourth switching unit includes at least one power semiconductor switch, and the at least one power semiconductor switch can be an IGBT, a GTO thyristor, an IGCT or other full-controlled power semiconductor elements, according to the design requirements. When the amount of the at least one power semiconductor switches is more than one, the power semiconductor switches can connect in series, or the power semiconductor switches can connect in parallel.

Please note that the amounts of the power semiconductor switches in each of the switching units in FIG. 6 are for the illustrative purposes only, and is not meant to be a limitation of the present disclosure, people skilled in this field can choose the amount of the power semiconductor switches and the corresponding withstanding voltages according to the design requirements. For example, the two power semiconductor switches D1 and D2 connected in series can be integrated into a single power semiconductor switch, and the electrical character of that single power semiconductor switch is about the same as the total electrical characters of the power semiconductor switches D1 and D2 combined. The two power semiconductor switches D6 and D7 connected in series can be integrated into a single power semiconductor switch, and the electrical character of that single power semiconductor switch is about the same as the total electrical characters of the power semiconductor switches D6 and D7 combined.

In FIG. 6, for example, the power semiconductor switches D1-D8 can be diodes, and the power semiconductor switches S1-S4 can be IGBTs, GTO thyristors, IGCTs or other switching elements, according to the design requirements.

The bus capacitor module 640 includes a first bus capacitor module C3 and a second bus capacitor module C4. A terminal of the first bus capacitor module C3 connects to the positive terminal 641, and another terminal of the first bus capacitor module C3 connects to the neutral terminal 643; a terminal of the second bus capacitor module C4 connects to the neutral terminal 643, and another terminal of the second bus capacitor module C4 connects to the negative terminal 642.

Under operation, the AC terminal Vo of the five-level rectifier 600 receives an AC input power, and control on-off of the power semiconductor switches S1-S4 respectively by the PWM (Pulse With Modulation) signals, thereby allowing rectifying function of the five-level rectifier 600 by outputting a DC voltage from the first bus capacitor module C3 and the second bus capacitor module C4. In other exemplary embodiments, the PFM (Pulse Frequency Modulation) signals or the PAM (Pulse Amplitude Modulation) signals can be chose for respectively controlling on-off of the power semiconductor switches S1-34, thereby allowing the operation of the five-level rectifier 600.

For further describe the operations of the five-level rectifier 600, please refer to table 6, while in operation, a voltage on each of the power semiconductor switches is V/2, and the on-off states corresponding to each voltage on the AC terminal Vo are illustrated as table 6. The "ON" in table 2 means "turns on" and the "OFF" in table 6 means "turns off"; the voltage of the AC terminal Vo comparative to the neutral terminal can be adjusted to V, V/2, 0, −V, −V/2 (i.e., the five voltage levels). In addition, the voltage waveforms of the AC terminal Vo of the five-level converter are illustrated in FIG. 7.

TABLE 6

|    | State 1 | State 2 | State 3 | State 4 | State 5 | State 6 | State 7 | State 8 |
|----|---------|---------|---------|---------|---------|---------|---------|---------|
| D1 | ON  | OFF | ON  | OFF | OFF | OFF | OFF | OFF |
| D2 | ON  | OFF | ON  | OFF | OFF | OFF | OFF | OFF |
| D3 | ON  | ON  | OFF | OFF | OFF | OFF | OFF | OFF |
| D4 | OFF | OFF | OFF | ON  | OFF | ON  | OFF | OFF |
| D5 | OFF | OFF | ON  | OFF | ON  | OFF | OFF | OFF |
| D6 | OFF | OFF | OFF | OFF | OFF | OFF | ON  | ON  |
| D7 | OFF | OFF | OFF | OFF | OFF | OFF | ON  | ON  |
| D8 | OFF | OFF | OFF | OFF | OFF | ON  | OFF | ON  |
| S1 | ON  | ON  | OFF | ON  | ON  | ON  | OFF | OFF |
| S2 | OFF | OFF | ON  | ON  | ON  | OFF | ON  | ON  |
| S3 | OFF | ON  | ON  | ON  | ON  | ON  | ON  | ON  |
| S4 | ON  | ON  | OFF | ON  | ON  | OFF | ON  | OFF |
| VO | V   | V/2 | V/2 | 0   | 0   | −V/2 | −V/2 | −V  |

Table 6 illustrates an operation mode of the five-level rectifier 600, however, please note that the five-level rectifier 600 has many operation modes, table 6 is merely an exemplary embodiment. In addition, the applications of the five-level rectifier 600 are easily understood by people with ordinary skills in this art, and are not in the scope of the present disclosure, thereby further descriptions are omit for the sake of brevity.

In summary, the present disclosure provides a five-level convertor topology with a simple structure, which uses asymmetrical circuit structure (two flying capacitor units has different connections), thereby the circuit design is more flexible and resilient. Compared to the traditional three-level technology, the five-level conversion technology here has better electrical performance.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A five-level converting device, comprising:
   an AC terminal;
   a bus capacitor module, having a positive terminal, a negative terminal and a neutral terminal;
   a first switch module, having a bidirectional switching circuit, wherein the bidirectional switching circuit comprises two first switching units reversely connected in series, a terminal of one of the two first switching units connects to the neutral terminal of the bus capacitor module;
   a second switch module, having two second switching units, two third switching units, two fourth switching units and two fifth switching units, wherein the two second switching unit are cascaded to each other, the two third switching units, the two fourth switching units and the two fifth switching units are cascaded and are connected to the bus capacitor module in parallel, wherein the two third switching units are connected to the positive terminal of the bus capacitor module, the two fifth switching units are connected to the negative terminal of the bus capacitor module, the two fourth switching units and the two second switching units are connected in parallel, wherein a connection point between the two fourth switching units connects to the AC terminal, a connection point between the two second switching units connects to a terminal of the other first switching unit of the two first switching units; and
   two flying capacitor modules, connected across the first switch module and the second switch module, wherein a connection point between the two first switching units, and the connection point between the two second switching units are respectively connected to a connection point between the two third switching units and a connection point between the two fifth switching units through the two flying capacitor modules.

2. The five-level converting device of claim 1, wherein one of the two third switching units connects to the positive terminal, and the other of the two third switching units connects to one of the two fourth switching units; one of the two fifth switching units connects to the other of the fourth switching units, and the other of the two fifth switching units connects to the negative terminal.

3. The five-level converting device of claim 2, wherein the two flying capacitor modules are a first flying capacitor module and a second flying capacitor module, a terminal of the first flying capacitor module connects to the connection point between the two first switching units, a terminal of the second flying capacitor module connects to the connection point between the two second switching units.

4. The five-level converting device of claim 3, wherein another terminal of the first flying capacitor module connects to the connection point of the two third switching unit, another terminal of the second flying capacitor module connects to the connection point between the two fifth switching units.

5. The five-level converting device of claim 2, wherein the two flying capacitor modules are a first flying capacitor module and a second flying capacitor module, a terminal of the first flying capacitor module connects to the connection point between the two second switching units, a terminal of the second flying capacitor module connects to the connection point of the two first switching units.

6. The five-level converting device of claim 5, wherein another terminal of the first flying capacitor module connects to the connection point between the two third switching units; another terminal of the second flying capacitor module connects to the another terminal of between the two fifth switching units.

7. The five-level converting device of claim 1, wherein each of the first switching units comprises at least one power semiconductor switch, and the power semiconductor switch is an insulated gate bipolar transistor (IGBT), a gate turn-off (GTO) thyristor, or an integrated gate commutated thyristor (IGCT).

8. The five-level converting device of claim 1, wherein each of the second switching units comprises at least one power semiconductor switch, and the power semiconductor switch is a diode.

9. The five-level converting device of claim 8, wherein each of the fourth switching units comprises at least one power semiconductor switch, and the power semiconductor switch is an insulated gate bipolar transistor (IGBT), a gate turn-off (GTO) thyristor, or an integrated gate commutated thyristor (IGCT).

10. The five-level converting device of claim 9, wherein each of the third switching units and of the fifth switching units comprises at least one power semiconductor switch, and the power semiconductor switch is an insulated gate bipolar transistor (IGBT), a gate turn-off (GTO) thyristor, or an integrated gate commutated thyristor (IGCT).

11. The five-level converting device of claim 9, wherein each of the third switching units and of the fifth switching units comprises at least one power semiconductor switch, and the power semiconductor switch is a diode.

12. The five-level converting device of claim 1, wherein each of the second switching units comprises at least one power semiconductor switch, and the power semiconductor switch is an insulated gate bipolar transistor (IGBT), a gate turn-off (GTO) thyristor, or an integrated gate commutated thyristor (IGCT).

13. The five-level converting device of claim 12, wherein each of the fourth switching unites comprises at least one power semiconductor switch, and the power semiconductor switch is a diode.

14. The five-level converting device of claim 13, wherein each of the third switching units and of the fifth switching units comprises at least one power semiconductor switch, and the power semiconductor switch is a diode.

15. The five-level converting device of claim 1, wherein the bus capacitor module comprises:
   a first bus capacitor module, two terminals of the first bus capacitor module respectively connect to the positive terminal and the neutral terminal; and
   a second bus capacitor module, two terminals of the second bus capacitor module respectively connect to the neutral terminal and the negative terminal.

16. The five-level converting device of claim 1, wherein each of the flying capacitor modules comprises at least one capacitor.

* * * * *